(12) United States Patent
Yamaoka et al.

(10) Patent No.: US 10,753,426 B2
(45) Date of Patent: Aug. 25, 2020

(54) GEARED MOTOR AND MANUFACTURING METHOD FOR GEARED MOTOR

(71) Applicants: DENSO CORPORATION, Aichi (JP); NIDEC SANKYO CORPORATION, Nagano (JP)

(72) Inventors: Mamoru Yamaoka, Nagano (JP); Koji Aizawa, Nagano (JP)

(73) Assignees: DENSO CORPORATION, Aichi (JP); NIDEC SANKYO CORPORATION, Nagano (JP)

( * ) Notice: Subject to any disclaimer, the term of this patent is extended or adjusted under 35 U.S.C. 154(b) by 244 days.

(21) Appl. No.: 15/766,744

(22) PCT Filed: Oct. 31, 2016

(86) PCT No.: PCT/JP2016/082251
§ 371 (c)(1),
(2) Date: Apr. 6, 2018

(87) PCT Pub. No.: WO2017/082099
PCT Pub. Date: May 18, 2017

(65) Prior Publication Data
US 2018/0291982 A1    Oct. 11, 2018

(30) Foreign Application Priority Data
Nov. 9, 2015 (JP) ................. 2015-219019

(51) Int. Cl.
*F16H 1/06* (2006.01)
*H02K 37/14* (2006.01)
(Continued)

(52) U.S. Cl.
CPC ............... *F16H 1/06* (2013.01); *H02K 7/116* (2013.01); *H02K 37/14* (2013.01); *H02K 37/24* (2013.01); *Y10T 74/19684* (2015.01)

(58) Field of Classification Search
CPC .......... F16H 1/06; H02K 7/116; H02K 37/24; H02K 37/14; H02K 5/161; Y10T 74/19684
See application file for complete search history.

(56) References Cited

U.S. PATENT DOCUMENTS

| | | | |
|---|---|---|---|
| 7,768,163 B2 * | 8/2010 | Kasai | ............... H02K 7/081 310/49.05 |
| 2009/0127952 A1 | 5/2009 | Kasai | |
| 2018/0298951 A1 * | 10/2018 | Yamaoka | ............... H02K 37/14 |

FOREIGN PATENT DOCUMENTS

| | | |
|---|---|---|
| EP | 2 424 081 A1 | 2/2012 |
| JP | H04-138052 A | 5/1992 |

(Continued)

OTHER PUBLICATIONS

WIPO, International Search Report for PCT/JP2016/082251, dated Jan. 24, 2017.

(Continued)

*Primary Examiner* — Jeremy R Severson

(57) ABSTRACT

Provided are: a geared motor with which a large torque can be obtained without an increase in size; and a method for producing said geared motor. In this geared motor (1), an output member (8) having a helical groove (83) formed in an outer circumferential section is provided between a first plate part (31) and a second plate part (32) of a frame (3), and the rotation of a motor pinion (55) is reduced in speed by a reduction gear mechanism (9) and is transmitted to a gear part (85) of the output member (8). In this geared motor (1): the output member (8) is arranged between the first plate part (31) and the second plate part (32); then, a first fixing shaft (35) is inserted from a through hole (37) in the second plate part (32) into a shaft hole (81) in the output member (8), and a first shaft end part (351) is fitted into a first fixing (Continued)

shaft support hole (36); and then, a second shaft end part (352) and the second plate part (32) are fixed.

14 Claims, 6 Drawing Sheets

(51) Int. Cl.
    *H02K 37/24*     (2006.01)
    *H02K 7/116*     (2006.01)

(56) References Cited

FOREIGN PATENT DOCUMENTS

| JP | 2001-215395 A | 8/2001 |
| JP | 2007-110817 A | 4/2007 |
| JP | 2008-141825 A | 6/2008 |
| JP | 2009-124867 A | 6/2009 |
| JP | 2009-124868 A | 6/2009 |
| JP | 2012-062963 A | 3/2012 |

OTHER PUBLICATIONS

WIPO, Written Opinion of the International Searching Authority for PCT/JP2016/082251, dated Jan. 24, 2017.
European Patent Office, Extended European Search Report for European Patent Application No. 16864062.1, dated Apr. 8, 2019.
The State Intellectual Property Office of the People's Republic of China, The first Office Action for Chinese Patent Application No. 201680063784.X, dated Jul. 3, 2019.

\* cited by examiner

GEARED MOTOR AND MANUFACTURING METHOD FOR GEARED MOTOR

FIELD OF THE INVENTION

The present invention relates to a geared motor in which rotation of a motor pinion is transmitted to an output member through a transmission gear, and to a manufacturing method for the geared motor.

BACKGROUND ART

As a technique for outputting a large torque from a motor, a geared motor has been proposed in which an output member whose outer peripheral portion is formed with a spiral groove is provided between a first plate part and a second plate part of a frame and a motor pinion fixed to a rotation shaft is transmitted to a gear part of the output member (see Patent Literature 1). In the geared motor, the output member is rotatably supported between a bearing provided in the first plate part and the second plate part. A large opening part is provided in the first plate part and, when the geared motor is to be manufactured, the output member is passed through the opening part between the first plate part and the second plate part.

CITATION LIST

Patent Literature

[PTL 1] Japanese Patent Laid-Open No. 2009-124867

SUMMARY OF THE INVENTION

Technical Problem

However, in the geared motor described in Patent Literature 1, the bearing is protruded from the first plate part to a side of the motor main body and thus, it is required that a size of the first plate part is increased and the bearing is provided at a position separated in a direction intersecting the motor shaft line from the motor main body. Therefore, a size of the geared motor is increased. Further, in the geared motor described in Patent Literature 1, rotation of the motor pinion fixed to the rotation shaft is directly transmitted to the gear part of the output member and thus the gear part of the output member is required to be enlarged for obtaining a large torque. As a result, the gear part of the output member is projected from the first plate part in a direction intersecting the motor shaft line and thus a size of the geared motor is increased.

In view of the problem described above, an objective of the present invention is to provide a geared motor capable of obtaining a large torque without increasing its size, and to provide a manufacturing method for the geared motor.

Means to Solve the Problems

To achieve the above mentioned objective, the present invention provides a geared motor including a motor main body, and a frame having a first plate part which is fixed to an end part on one side in a motor axial line direction of the motor main body, a second plate part which faces the first plate part on the one side, and a third plate part which connects the first plate part with the second plate part. The geared motor further includes a first fixed shaft which is disposed between the first plate part and the second plate part, an output member having a shaft hole through which the first fixed shaft is penetrated, and a gear part and a spiral groove which are provided on an outer peripheral portion of the output member in order from the other side to the one side in the motor axial line direction, a second fixed shaft whose shaft end part on the other side is held by the first plate part, and a transmission gear which is rotatably supported by the second fixed shaft and decelerates rotation of a motor pinion fixed to a rotation shaft of the motor main body to transmit to the gear part. The first fixed shaft is fixed so that, in a state that a first shaft end part on the other side is fitted to a first fixed shaft support hole provided in the first plate part, and that a second shaft end part on the one side is fitted to a through hole provided in the second plate part, the second shaft end part and the second plate part are fixed to each other.

Further, the present invention provides a manufacturing method for a geared motor, the geared motor including a motor main body, a frame having a first plate part which is fixed to an end part on one side in a motor axial line direction of the motor main body, a second plate part which faces the first plate part on the one side, and a third plate part which connects the first plate part with the second plate part, a first fixed shaft which is disposed between the first plate part and the second plate part, an output member having a shaft hole through which the first fixed shaft is penetrated and a gear part and a spiral groove which are provided on an outer peripheral portion of the output member in order from the other side to the one side in the motor axial line direction, a second fixed shaft whose shaft end part on the other side is held by the first plate part, and a transmission gear which is rotatably supported by the second fixed shaft and decelerates rotation of a motor pinion fixed to a rotation shaft of the motor main body to transmit to the gear part. The manufacturing method includes a frame fixing step in which the first plate part is previously provided with a first fixed shaft support hole to which a first shaft end part on the other side of the first fixed shaft is fitted, and the second plate part is previously provided with a through hole to which a second shaft end part on the one side of the first fixed shaft is fitted, and the frame is fixed to the motor main body, a gear attaching step in which the transmission gear is attached to the first plate part through the second fixed shaft before or after the frame fixing step, an arrangement step in which the output member is disposed between the first plate part and the second plate part from a direction intersecting the motor axial line direction, a first fixed shaft inserting step in which the first fixed shaft is inserted into the shaft hole through the through hole and the first shaft end part is fitted to the first fixed shaft support hole, and a first fixed shaft fixing step in which the second shaft end part and the second plate part are fixed to each other.

In the present invention, the output member formed with the spiral groove on its outer peripheral portion is provided between the first plate part and the second plate part of the frame, and rotation of the motor pinion fixed to the rotation shaft is decelerated through the transmission gear to be transmitted to the output member. Therefore, a large torque can be outputted even when the diameter of the gear part of the output member is not increased. Further, the first fixed shaft is provided between the first plate part and the second plate part, and the output member is rotatably supported by the first fixed shaft. Therefore, a bearing is not required to be provided in the first plate part and thus a size of the first plate part is not required to be increased. Accordingly, a size of the geared motor can be reduced. Further, the first plate part is provided with the first fixed shaft support hole to which the first shaft end part of the first fixed shaft is fitted, and the second plate part is provided with the through hole to which the second shaft end part of the first fixed shaft is fitted. Therefore, after the output member is disposed between the first plate part and the second plate part, the first fixed shaft is inserted into the shaft hole of the output member through the through hole of the second plate part so that the first shaft end part is fitted to the first fixed shaft support hole and, after that, the second shaft end part and the second plate part can be fixed to each other. Accordingly, the output member can be rotatably supported between the first plate part and the second plate part without providing a large opening part for passing the output member in the first plate part. Further, a large opening part is not required to be provided in the first plate part and thus, even when a size of the first plate part is not increased, the second fixed shaft which supports the transmission gear can be provided at a proper position. Therefore, a size of the geared motor can be reduced.

In the present invention, it is preferable that the first fixed shaft is provided at a position overlapped with the motor main body in the motor axial line direction. According to this structure, a size of the first plate part can be reduced and thus a size of the geared motor can be reduced.

In the geared motor in accordance with the present invention, it is preferable that the first shaft end part is abutted with a protruded part in an inside of the first fixed shaft support hole or a bottom part of the first fixed shaft support hole. According to this structure, after the output member has been disposed between the first plate part and the second plate part, when the first fixed shaft is inserted into the shaft hole of the output member through the through hole of the second plate part and the first shaft end part is fitted to the first fixed shaft support hole, the first fixed shaft can be fixed in the motor axial line direction.

In the geared motor in accordance with the present invention, it is preferable that the geared motor further includes a gear cover which is fixed to the frame between the first plate part and the second plate part, and the gear cover is provided with an end plate part which covers the motor pinion, the transmission gear and the gear part on the one side, and a side plate part which covers an outer peripheral portion of the gear part on an opposite side to the transmission gear and, in addition, the end plate part is provided with an opening part from which a portion provided with the spiral groove of the output member is protruded to the one side. In other words, in the manufacturing method for a geared motor in accordance with the present invention, the geared motor includes a gear cover provided with an end plate part which covers the motor pinion, the transmission gear and the gear part on the one side, and a side plate part which covers an outer peripheral portion of the gear part on an opposite side to the transmission gear, and the end plate part of the gear cover is provided with an opening part from which a portion provided with the spiral groove of the output member is protruded to the one side. In the arrangement step, the gear cover is disposed between the first plate part and the second plate part together with the output member, and the gear cover is fixed to the frame. According to this structure, a foreign matter is hard to be stuck to the motor pinion, the transmission gear and the gear part. Further, even in a case that grease is applied between the motor pinion and the transmission gear and between the transmission gear and the gear part, a foreign matter is hard to be stuck to the grease.

In the geared motor in accordance with the present invention, it is preferable that the end plate part is provided with a second fixed shaft support hole which supports a shaft end part on the one side of the second fixed shaft. In other words, in the geared motor in accordance with the present invention, it is preferable that the end plate part is previously provided with a second fixed shaft support hole which supports a shaft end part on the one side of the second fixed shaft and, in the arrangement step, the shaft end part on the one side of the second fixed shaft is fitted and supported by the second fixed shaft support hole. According to this structure, the second fixed shaft can be supported surely.

In the geared motor in accordance with the present invention, it is preferable that a face on the other side of the end plate part is provided with a recessed part which is extended in a direction intersecting a motor axial line from the second fixed shaft support hole. In other words, in the geared motor in accordance with the present invention, it is preferable that a face on the other side of the end plate part is previously provided with a recessed part which is extended in a direction intersecting a motor axial line from the second fixed shaft support hole and, in the arrangement step, when the output member and the gear cover are to be disposed between the first plate part and the second plate part, the shaft end part on the one side of the second fixed shaft is passed in an inside of the recessed part and fitted to the second fixed shaft support hole. According to this structure, even in a case that the gear cover is disposed in a direction intersecting the motor axial line, the shaft end part on the one side in the motor axial line direction of the second fixed shaft can be easily fitted to the second fixed shaft support hole.

The present invention is effectively applied to a case that the output member is made of resin. In a case that the output member is made of resin, an outer diameter of the output member is required to be increased in order to secure its strength. However, according to the present invention, a large opening part for passing the output member is not required to be provided in the first plate part.

In the geared motor in accordance with the present invention, it is preferable that the gear cover is provided with an engaging part which is engaged with the frame when the gear cover is disposed between the first plate part and the second plate part from a direction intersecting the motor axial line direction. In other words, in the geared motor in accordance with the present invention, it is preferable that the gear cover is previously provided with an engaging part which is engaged with the frame when the gear cover is disposed between the first plate part and the second plate part and, in the arrangement step, when the gear cover is disposed between the first plate part and the second plate part, the first plate part and the engaging part are engaged with each other and the gear cover is fixed to the frame. According to this structure, the gear cover can be fixed at a predetermined position of the frame.

In the geared motor in accordance with the present invention, it is preferable that the second shaft end part is fixed to the second plate part by welding. According to this structure, the first fixed shaft can be surely fixed to the frame.

DESCRIPTION OF EMBODIMENTS

Figure 1A:
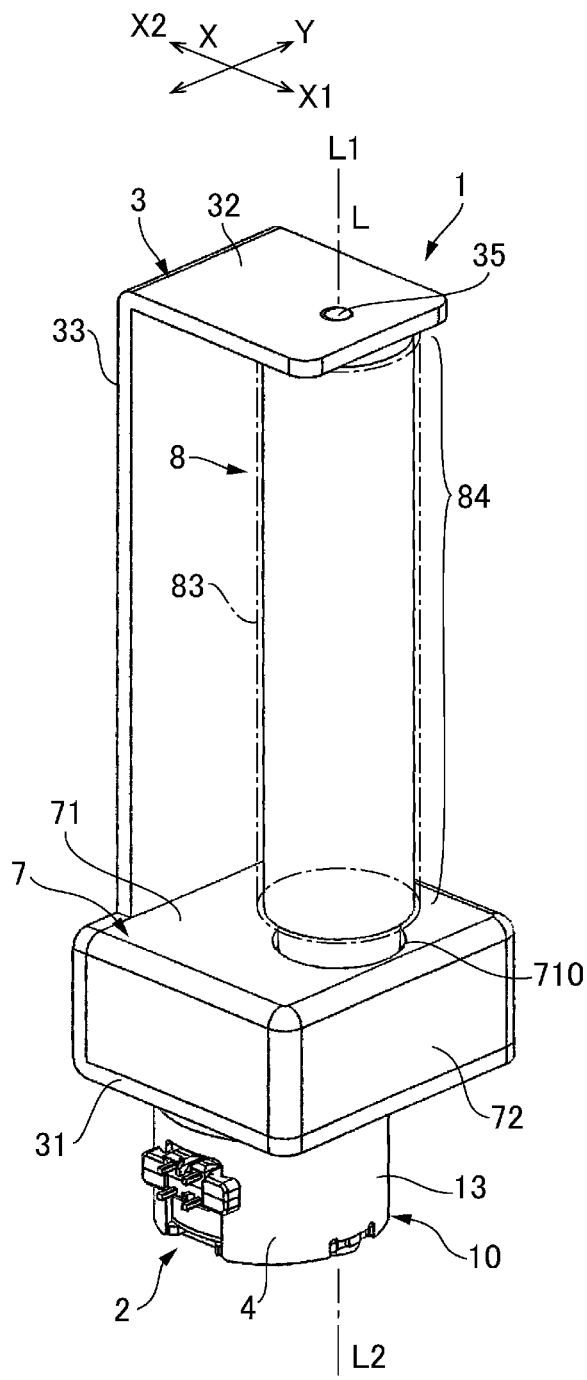
FIGS. 1(a) and 1(b) are explanatory views showing a geared motor to which the present invention is applied.

An embodiment of a geared motor to which the present invention is applied will be described below with reference to the accompanying drawings. In the geared motor 1 described below, a rotation center axial line of a rotation shaft 50 of a motor main body 10 and a rotation center axial line of an output member 8 are parallel to each other and thus, both of the rotation center axial lines may be regarded as a motor axial line. In the following descriptions, the rotation center axial line of the output member 8 will be described as a motor axial line "L". Further, in the following descriptions, in a direction where the motor axial line "L" is extended (motor axial line "L" direction), one side where the rotation shaft 50 is protruded from a stator 4 is referred to as an output side "L1", and an opposite side (the other side) to the side where the rotation shaft 50 is protruded from the stator 4 is referred to as an opposite-to-output side "L2". Further, in a direction intersecting the motor axial line "L", a direction perpendicular to a third plate part 33 of a frame 3 is referred to as a first direction "X", and a direction perpendicular to the first direction "X" and the motor axial line "L" is referred to as a second direction "Y". Further, in the first direction "X", a side where a first plate part 31 and a second plate part 32 are protruded from the third plate part 33 is referred to as one side "X1", and a side where the third plate part 33 is located is referred to as the other side "X2". Further, in the following drawings, a forming range of a spiral groove 83 is schematically shown by the alternate long and short dash line.

(Entire Structure)

Figure 1B:
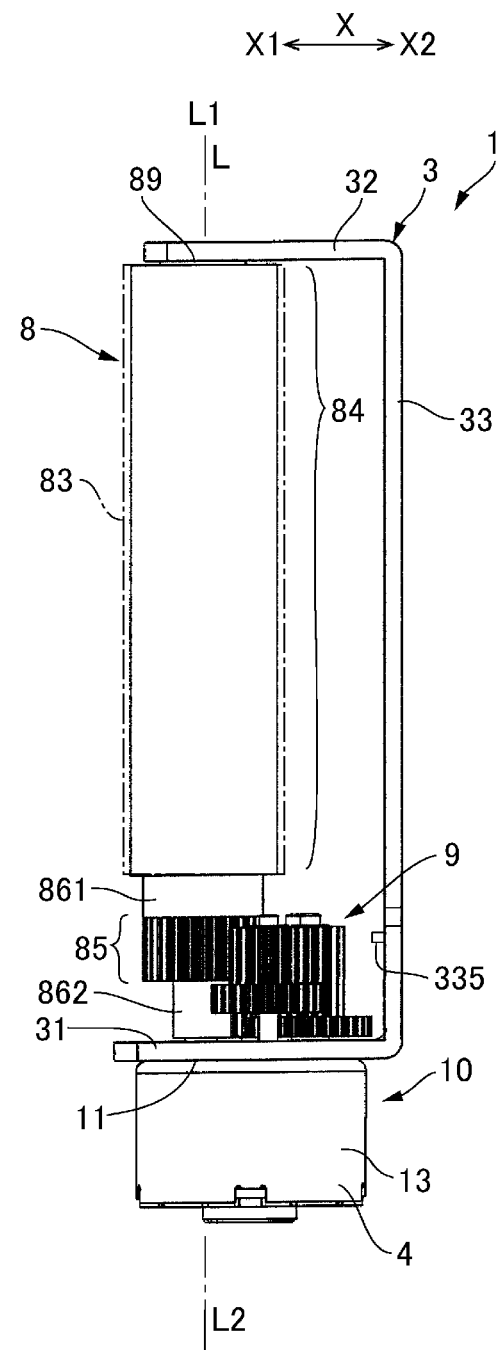
Figures 2A, 2B, 2C, 2D:
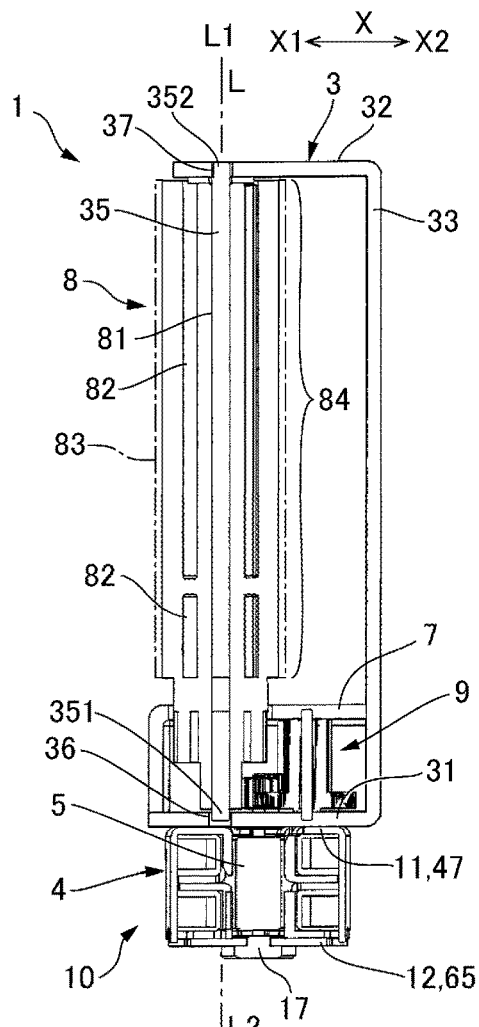
FIGS. 2(a), 2(b), 2(c) and 2(d) are cross-sectional views showing a geared motor to which the present invention is applied.
Figure 3A:
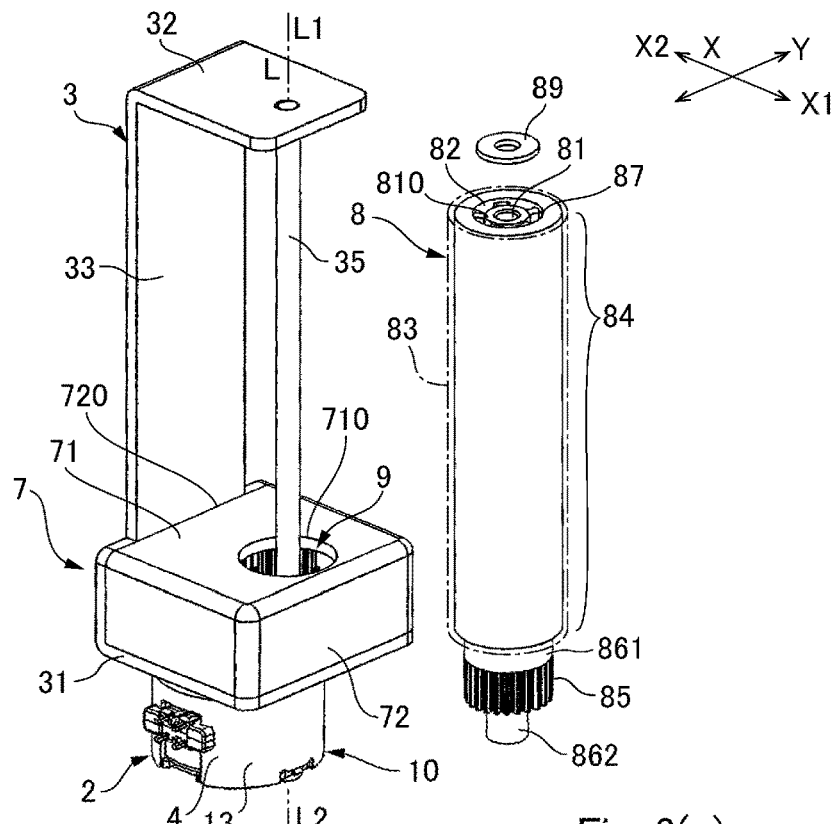
FIGS. 3(a) and 3(b) are exploded perspective views showing an inside of a geared motor to which the present invention is applied and which are viewed from an output side.
Figure 3B:
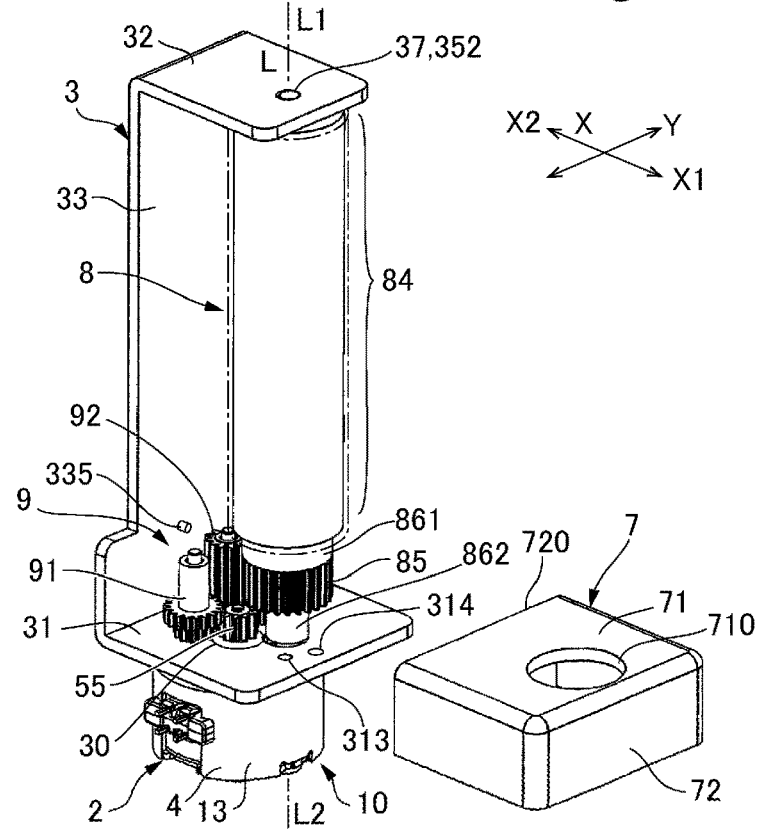
Figures 4A, 4B:
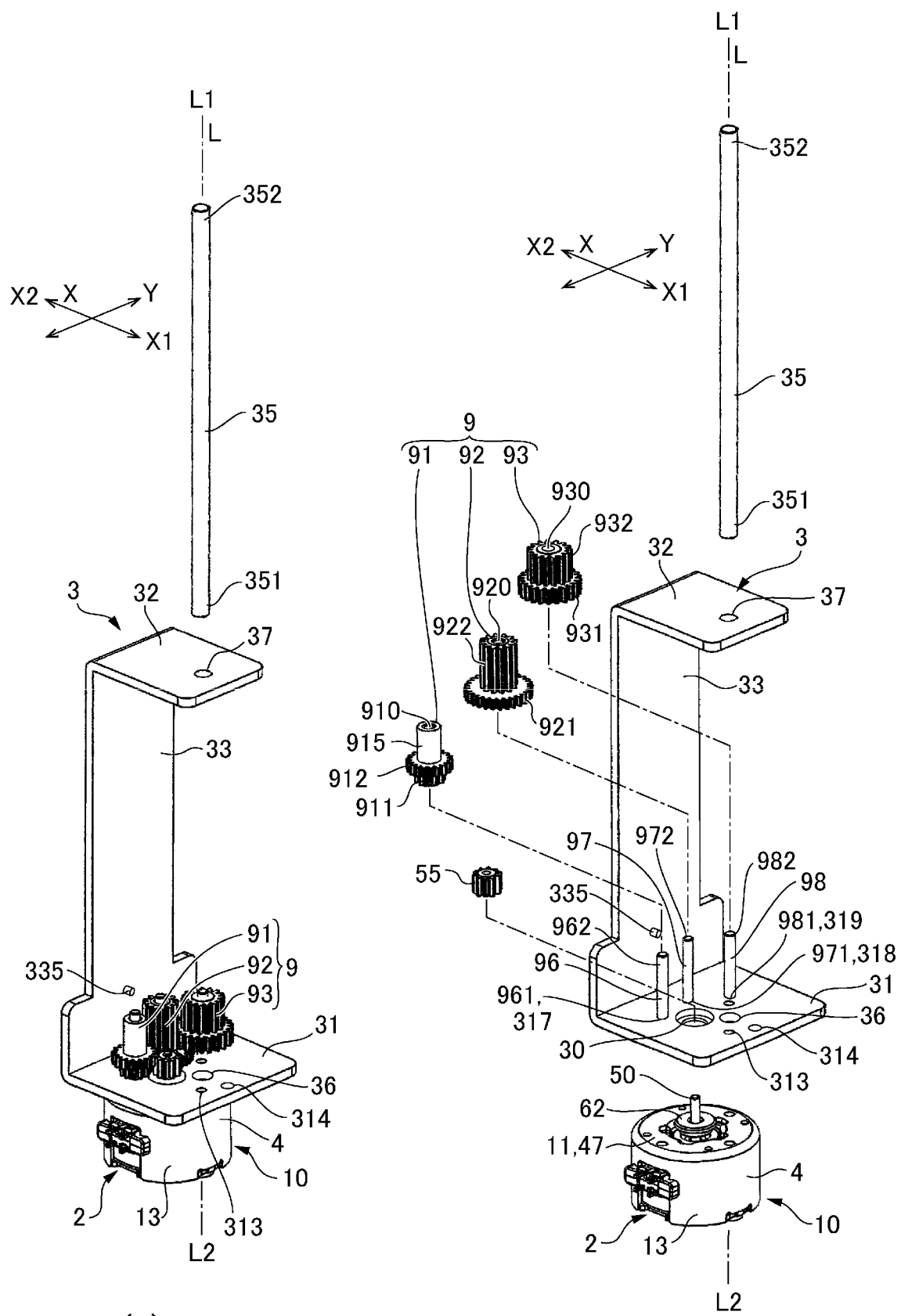
FIGS. 4(a) and 4(b) are explanatory views showing a reduction gear mechanism and the like of a geared motor to which the present invention is applied.

FIGS. 1(a) and 1(b) are explanatory views showing a geared motor 1 to which the present invention is applied. FIG. 1(a) is a perspective view showing a geared motor 1 which is viewed from an output side "L1", and FIG. 1(b) is a side view showing a state that a gear cover 7 is detached from the geared motor 1 which is viewed in a direction perpendicular to the motor axial line "L" (second direction "Y"). FIGS. 2(a), 2(b), 2(c) and 2(d) are cross-sectional views showing the geared motor 1 to which the present invention is applied. FIG. 2(a) is a cross-sectional view showing the geared motor 1 which is cut along the motor axial line "L", FIG. 2(b) is a cross-sectional view showing the motor main body 10 which is cut along the rotation center axial line of the rotation shaft 50, FIG. 2(c) is a cross-sectional view showing the second plate part 32 of the frame 3 which is cut at a position of a through hole 37, and FIG. 2(d) is a cross-sectional view showing the first plate part 31 of the frame 3 which is cut at a position of a first fixed shaft support hole 36. FIGS. 3(a) and 3(b) are exploded perspective views showing an inside of the geared motor 1 to which the present invention is applied and which are viewed from the output side "L1". FIG. 3(a) is an exploded perspective view showing a state that the output member 8 is detached from the geared motor 1 and FIG. 3(b) is an exploded perspective view showing a state that a gear cover 7 is detached from the geared motor 1. FIGS. 4(a) and 4(b) are explanatory views showing a reduction gear mechanism 9 and the like of the geared motor 1 to which the present invention is applied. FIG. 4(a) is a perspective view showing the reduction gear mechanism 9 and the like, and FIG. 4(b) is an exploded perspective view showing the reduction gear mechanism 9 and the like.

As shown in FIGS. 1 through 4(b), the geared motor 1 includes the motor main body 10 and the frame 3 which is fixed to an end part 11 on one side (output side "L1") in the motor axial line "L" direction of the motor main body 10. The frame 3 is provided with the first plate part 31 fixed to the end part 11 on the output side "L1" of the motor main body 10 by a method such as welding, the second plate part 32 which faces the first plate part 31 on the output side "L1", and the third plate part 33 which connects the first plate part 31 with the second plate part 32. Therefore, the first plate part 31 and the second plate part 32 are structured so as to be bent toward one side "X1" in the first direction "X" from the third plate part 33. The first plate part 31 is formed in a substantially rectangular shape. A power feeding part 2 is provided on a side face of the motor main body 10.

The first plate part 31 is formed with a step-shaped hole 30 and the rotation shaft 50 of the motor main body 10 is protruded to an output side "L1" from the first plate part 31 through the hole 30. A motor pinion 55 is fixed to a portion of the rotation shaft 50 protruded to the output side "L1" from the first plate part 31.

A reduction gear mechanism 9 is provided between the first plate part 31 and the second plate part 32. Rotation of the motor pinion 55 (rotation of the rotation shaft 50) is transmitted to an output member 8 through the reduction gear mechanism 9. A gear cover 7 which covers the motor pinion 55 and the reduction gear mechanism 9 on the output side "L1" is disposed between the first plate part 31 and the second plate part 32, and the gear cover 7 is fixed to the frame 3.

(Fixing Structure of First Fixed Shaft 35)

A first fixed shaft 35 is provided between the first plate part 31 and the second plate part 32 and rotatably supports the output member 8 around the motor axial line "L". A first shaft end part 351 on the opposite-to-output side "L2" of the first fixed shaft 35 is fitted into a first fixed shaft support hole 36 formed in the first plate part 31 (see FIG. 2(d)). A second shaft end part 352 on the output side "L1" of the first fixed shaft 35 is fixed to the second plate part 32 in a state that the second shaft end part 352 is fitted into a through hole 37 formed in the second plate part 32 (see FIG. 2(c)). A method such as welding, caulking or adhesion may be utilized for the fixing. In this embodiment, the frame 3 is made of SUCC (low carbon stainless steel) and the first fixed shaft 35 is made of SUS (stainless steel). Therefore, the second shaft end part 352 and the second plate part 32 are fixed to each other by welding. Accordingly, the first fixed shaft 35 is surely fixed to the frame 3. Further, when welding is utilized, a burr or the like is hard to occur in comparison with a case that caulking or adhesion is utilized. In accordance with an embodiment of the present invention, the frame 3 and the first fixed shaft 35 may be formed of the same metal.

The first fixed shaft support hole 36 of the first plate part 31 is a through hole. However, when the first fixed shaft support hole 36 is to be formed, a circular ring-shaped protruded part 361 is left at an end part on the opposite-tooutput side "L2" in an inside of the first fixed shaft support hole 36 (see FIG. 2(d)). An inner diameter of the protruded part 361 is smaller than an outer diameter of the first shaft end part 351. Therefore, the first shaft end part 351 is abutted with the protruded part 361 from the output side "L1" in the inside of the first fixed shaft support hole 36 and thereby a position of the first shaft end part 351 in the motor axial line "L" direction is restricted. The first fixed shaft support hole 36 may be provided with a bottom part and, in this case, the first shaft end part 351 is abutted with the bottom part of the first fixed shaft support hole 36 and thereby the position in the motor axial line "L" direction is restricted. In this embodiment, the first fixed shaft 35 is provided at a position overlapped with the motor main body 10 in the motor axial line "L" direction.

(Structure of Output Member 8)

The output member 8 is a shaft-shaped member which is formed with a shaft hole 81 through which the first fixed shaft 35 is penetrated. An outer peripheral portion of the output member 8 is formed with a gear part 85 and a spiral groove 83 in this order from the opposite-to-output side "L2" to the output side "L1". In this embodiment, the output member 8 is structured as a worm gear by providing the spiral groove 83. The output member 8 is provided with a shaft part 861, on which teeth or the like are not formed, between the gear part 85 and the spiral groove 83, and a shaft part 862, on which teeth or the like are not formed, from the gear part 85 toward the opposite-to-output side "L2" in the motor axial line "L" direction.

An outer diameter of a portion 84 of the output member 8 where the spiral groove 83 is provided is the largest, and outer diameters of the gear part 85 and the shaft part 861 are smaller than the outer diameter of the portion 84 where the spiral groove 83 is provided. Further, an outer diameter of the shaft part 862 is smaller than the outer diameters of the gear part 85 and the shaft part 861.

The output member 8 is made of resin, and the gear part 85 and the spiral groove 83 are integrally formed as one molded product. Therefore, the output member 8 can be manufactured at a low cost. In this embodiment, an inside of the output member 8 is provided with hollows 82 for preventing shrinkage when the output member 8 is resin-molded. In an end part on the output side "L1" of the output member 8, a tube part 810 formed with the shaft hole 81 is disposed with a thrust bearing washer 89 for reducing sliding resistance between the output member 8 and the second plate part 32.

(Structure of Motor Main Body 10)

As shown in FIG. 2(b), the motor main body 10 is a stepping motor which includes a cylindrical tube shaped stator 4. The stator 4 is structured so that an "A"-phase stator and a "B"-phase stator are disposed so as to be superposed on each other in the motor axial line "L" direction. Therefore, in the stator 4, two coil bobbins (first coil bobbin 42A and second coil bobbin 42B) around each of which a coil wire 46 is wound are disposed so as to be superposed on each other in the motor axial line "L" direction. Stator cores described below are disposed and superposed on each of the coil bobbins. In the first coil bobbin 42A, an inner stator core 43A in a ring shape and an outer stator core 44A whose cross section is a "U"-shape are disposed on both sides in the motor axial line "L" direction in a superposed state. In the second coil bobbin 42B, an inner stator core 43B in a ring shape and an outer stator core 44B whose cross section is a "U"-shape are disposed on both sides in the motor axial line "L" direction in a superposed state. A plurality of pole teeth 45 of the inner stator cores 43A and 43B and the outer stator cores 44A and 44B are structured so as to be arranged in a circumferential direction on inner peripheral faces of the first coil bobbin 42A and the second coil bobbin 42B. In this way, the stator 4 in a cylindrical tube shape is structured and a rotor 5 is coaxially disposed on an inner side in a radial direction of the stator 4.

In this embodiment, the outer stator cores 44A and 44B are respectively extended to an outer side in the radial direction of the first coil bobbin 42A and the second coil bobbin 42B to structure a motor case. Therefore, an end part 11 on the output side "L1" of the motor main body 10 is structured of a ring-shaped portion 47 of the outer stator core 44A. An outer peripheral face 13 of the motor main body 10 is structured of cylindrical tube portions 49 formed on an outer side of the outer stator cores 44A and 44B. An end plate 65 is fixed to a ring-shaped portion 48 of the outer stator core 44B and an end part 12 on the opposite-to-output side "L2" of the motor main body 10 is structured of the end plate 65.

The rotation shaft 50 of the rotor 5 is extended along the motor axial line "L" and the rotation shaft 50 is protruded from an end part 11 on the output side "L1" of the motor main body 10. A permanent magnet 59 in a cylindrical tube shape is fixed at a position on an opposite-to-output side "L2" of the rotation shaft 50 with an adhesive or the like. An outer peripheral face of the permanent magnet 59 faces the pole teeth 45 of the stator 4 on an inner side in the radial direction of the stator 4 through a predetermined gap space.

On the output side "L1" of the motor main body 10, the rotation shaft 50 is supported by a bearing 62 which is disposed in a hole 30 of the first plate part 31 of the frame 3. A washer 66 through which the rotation shaft 50 is penetrated is disposed between the bearing 62 and the permanent magnet 59. On the opposite-to-output side "L2" of the motor main body 10, the end plate 65 is formed with a hole 650 through which an end part on the opposite-to-output side "L2" of the rotation shaft 50 is protruded to the opposite-to-output side "L2". A bearing 61 which supports the rotation shaft 50 on the opposite-to-output side "L2" is disposed in the hole 650, and a protruded part 17 which is protruded to the opposite-to-output side "L2" from the end face 12 on the opposite-to-output side "L2" is formed by the bearing 61 in the motor main body 10.

A washer 67 through which the rotation shaft 50 is penetrated is disposed between the bearing 61 and the permanent magnet 59. A coiled spring 63 which urges the rotor 5 to the output side "L1" is disposed around the rotation shaft 50 between a bottom part of a recessed part 595 of the permanent magnet 59 and the washer 67. A washer 69 through which the rotation shaft 50 is penetrated is disposed between the bottom part of the recessed part 595 of the permanent magnet 59 and the coiled spring 63.

(Structure of Reduction Gear Mechanism 9)

The reduction gear mechanism 9 includes a plurality of transmission gears. In this embodiment, the reduction gear mechanism 9 includes three transmission gears (first transmission gear 91, second transmission gear 92 and third transmission gear 93). As shown in FIGS. 4(a) and 4(b), the first transmission gear 91 is a composite gear, which is provided with a large diameter gear 911 meshed with the motor pinion 55, a small diameter gear 912 which is integrally and coaxially formed with the large diameter gear 911 on the output side "L1" of the large diameter gear 911, and a cylindrical tube part 915 which is integrally and coaxially formed with the small diameter gear 912 on the output side "L1" of the small diameter gear 912. The second transmission gear 92 is a composite gear, which is provided with a large diameter gear 921 meshed with the small diameter gear 912 of the first transmission gear 91 and a small diameter gear 922 which is integrally and coaxially formed with the large diameter gear 921 on the output side "L1" of the large diameter gear 921. The third transmission gear 93 is a composite gear, which is provided with a large diameter gear 931 meshed with the small diameter gear 922 of the second transmission gear 92 and a small diameter gear 932 which is integrally and coaxially formed with the large diameter gear 923 on the output side "L1" of the large diameter gear 931. The small diameter gear 932 is meshed with the gear part 85 of the output member 8.

The first transmission gear 91, the second transmission gear 92 and the third transmission gear 93 are respectively rotatably supported by three second fixed shafts 96, 97 and 98 which are supported by the first plate part 31. More specifically, the second fixed shaft 96 is fitted into a shaft hole 910 of the first transmission gear 91, and a shaft end part 961 on the opposite-to-output side "L2" of the second fixed shaft 96 is press-fitted and fixed to a hole 317 of the first plate part 31. The second fixed shaft 97 is fitted into a shaft hole 920 of the second transmission gear 92, and a shaft end part 971 on the opposite-to-output side "L2" of the second fixed shaft 97 is press-fitted and fixed to a hole 318 of the first plate part 31. The second fixed shaft 98 is fitted into a shaft hole 930 of the third transmission gear 93, and a shaft end part 981 on the opposite-to-output side "L2" of the second fixed shaft 98 is press-fitted and fixed to a hole 319 of the first plate part 31. In this embodiment, when viewed in the second direction "Y", the second fixed shafts 96, 97 and 98 are provided between the first fixed shaft support hole 36 which supports the first fixed shaft 35 and the third plate part 33, and the hole 30 is provided on the third plate part 33 side with respect to the first fixed shaft support hole 36. Therefore, when viewed in the second direction "Y", the first transmission gear 91, the second transmission gear 92 and the third transmission gear 93 are provided between the gear part 85 of the output member 8 and the third plate part 33, and the motor pinion 55 is provided on the third plate part 33 side with respect to the gear part 85 of the output member 8.

(Structure of Gear Cover 7)

Figure 5:
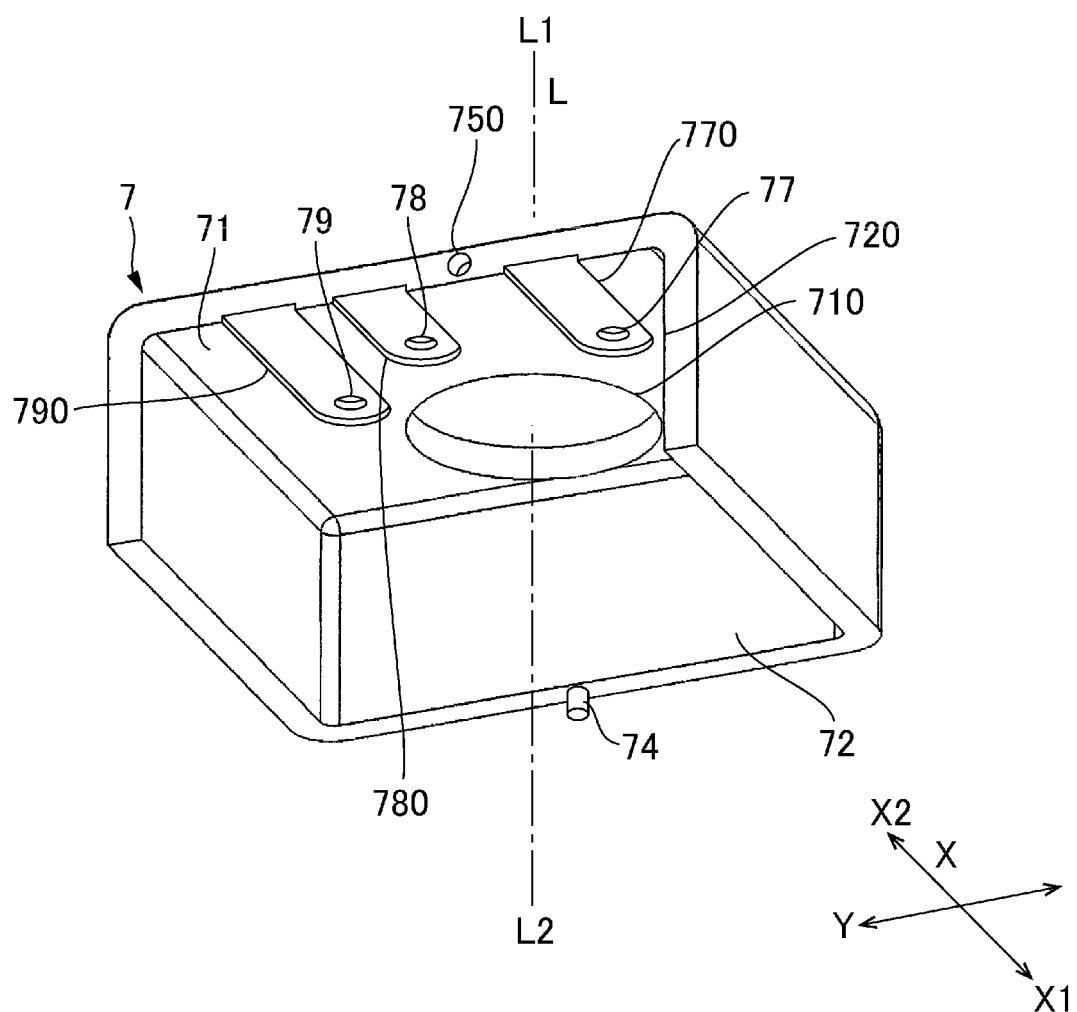
FIG. 5 is a perspective view showing a gear cover of a geared motor to which the present invention is applied and which is viewed from an opposite-to-output side.

FIG. 5 is a perspective view showing the gear cover 7 of the geared motor 1 to which the present invention is applied and which is viewed from the opposite-to-output side "L2".

As shown in FIGS. 1(a) and 1(b), FIGS. 3(a) and 3(b), and FIG. 5, the gear cover 7 is provided with an end plate part 71, which covers the motor pinion 55, the first transmission gear 91, the second transmission gear 92, the third transmission gear 93 and the gear part 85 of the output member 8 on the output side "L1", and a side plate part 72 which covers an outer peripheral portion of the gear part 85 on an opposite side (one side "X1" in the first direction "X") to the third plate part 33, the first transmission gear 91 and the second transmission gear 92. The side plate part 72 is overlapped with the first plate part 31. In this embodiment, the side plate part 72 is extended toward the third plate part 33 side (the other side "X2" in first direction "X") from an opposite side to the first transmission gear 91, the second transmission gear 92 and the third transmission gear 93 with respect to the gear part 85, and a side of the side plate part 72 where the third plate part 33 is located is formed to be an open end 720.

The end plate part 71 is formed with an opening part 710 for protruding a portion 84 provided with the spiral groove 83 of the output member 8 to the first plate part 31 side (output side "L1"). Further, the end plate part 71 is formed with second fixed shaft support holes 77, 78 and 79 to which shaft end parts 962, 972 and 982 on the other side (output side "L1") of the second fixed shafts 96, 97 and 98 are respectively fitted and supported. Therefore, both ends of each of the second fixed shafts 96, 97 and 98 are supported by the first plate part 31 of the frame 3 and the end plate part 71 of the gear cover 7. Accordingly, the second fixed shafts 96, 97 and 98 can be maintained in a stable posture.

A face on the opposite-to-output side "L2" of the end plate part 71 is formed with recessed parts 770, 780 and 790 which are extended from the second fixed shaft support holes 77, 78 and 79 to the other side "X2" in the first direction "X" (open end 720 side). In this embodiment, the recessed part 780 is formed around the second fixed shaft support hole 77 in a size so as to overlap with the cylindrical tube part 915 of the first transmission gear 91 and is extended to the open end 720 side (the other side "X2" in the first direction "X") from the circumference of the second fixed shaft support hole 77. The recessed part 780 is formed around the second fixed shaft support hole 78 in a size so as to overlap with the small diameter gear 922 of the second transmission gear 92 and is extended to the open end 720 side (the other side "X2" in the first direction "X") from the circumference of the second fixed shaft support hole 78. The recessed part 790 is formed around the second fixed shaft support hole 79 in a size so as to overlap with the small diameter gear 932 of the third transmission gear 93 and is extended to the open end 720 side (the other side "X2" in the first direction "X") from the circumference of the second fixed shaft support hole 79.

The gear cover 7 structured as described above is formed with an engaging part which is engaged with the frame 3. Specifically, the third plate part 33 is formed with an engaging protruded part 335 which is protruded toward one side "X1" in the first direction "X", and an engagement hole 750 (engaging part) is formed at an end part on the open end 720 side of the end plate part 71 of the gear cover 7. Therefore, when the gear cover 7 is fitted from one side "X1" toward the other side "X2" in the first direction "X" between the first plate part 31 and the second plate part 32 in a state that the open end 720 is directed toward the third plate part 33 side, the engaging protruded part 335 is fitted into and engaged with the engagement hole 750.

An engagement hole 314 is formed in the vicinity of an end part on one side "X1" in the first direction "X" of the first plate part 31, and an end part on the opposite-to-output side "L2" of the side plate part 72 is formed with an engaging protruded part 74 (engaging part). Therefore, after the gear cover 7 is fitted from one side "X1" toward the other side "X2" in the first direction "X" between the first plate part 31 and the second plate part 32 in a state that the open end 720 is directed toward the third plate part 33 side, when the gear cover 7 is pressed to the opposite-to-output side "L2", the engaging protruded part 74 is fitted into the engagement hole 314.

Accordingly, the gear cover 7 is fitted from one side "X1" toward the other side "X2" in the first direction "X" between the first plate part 31 and the second plate part 32 in a state that the open end 720 is directed toward the third plate part 33 side and thereby the gear cover 7 can be fixed to the frame 3.

In this embodiment, the first plate part 31 is formed with a hole 313 at an adjacent position to the engagement hole 314. The hole 313 is a positioning hole for fixing the frame 3 to the motor main body 10.

(Manufacturing Method)

Figure 6:
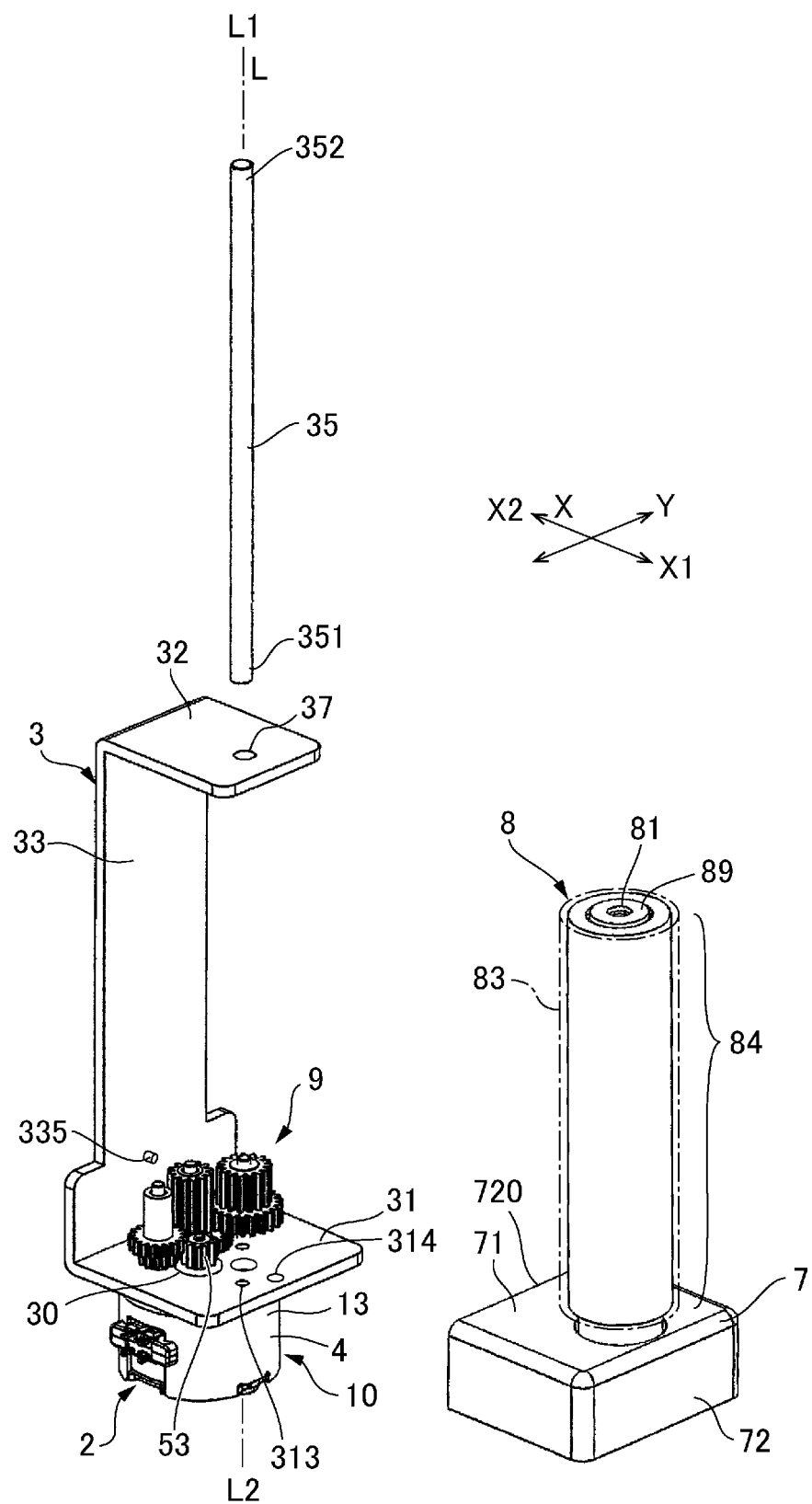
FIG. 6 is an explanatory view showing a step that an output member and a gear cover are to be assembled in manufacturing steps of a geared motor to which the present invention is applied.

FIG. 6 is an explanatory view showing a step that the output member 8 and the gear cover 7 are to be assembled in manufacturing steps of the geared motor 1 to which the present invention is applied. In manufacturing steps of the geared motor 1 in this embodiment, as shown in FIG. 6, the frame 3 is fixed to the motor main body 10 in a frame fixing step and, in a gear attaching step, before or after the frame fixing step, the first transmission gear 91, the second transmission gear 92 and the third transmission gear 93 are attached to the first plate part 31 through the second fixed shafts 96, 97 and 98.

Next, in an arrangement step, the output member 8 is fitted from one side "X1" in the first direction "X" intersecting the motor axial line "L" direction toward between the first plate part 31 and the second plate part 32. In this case, the output member 8 is inserted into the opening part 710 of the gear cover 7 and then, the output member 8 and the gear cover 7 are fitted together from one side "X1" in the first direction "X" intersecting the motor axial line "L" direction toward between the first plate part 31 and the second plate part 32. After the gear cover 7 is fitted between the first plate part 31 and the second plate part 32 in a state that the open end 720 is directed toward the third plate part 33 side, the gear cover 7 is pressed to the opposite-to-output side "L2". As a result, the engaging protruded part 335 of the frame 3 is fitted into and engaged with the engagement hole 750 of the gear cover 7. Further, the engaging protruded part 74 is engaged with the first plate part 31. Therefore, the gear cover 7 is fixed to the frame 3 and thus the gear cover 7 is easily fixed. Further, the shaft end parts 962, 972 and 982 of the second fixed shafts 96, 97 and 98 are passed inside the recessed parts 770, 780 and 790 of the gear cover 7 and automatically fitted to the second fixed shaft support holes 77, 78 and 79 and thus the gear cover 7 is easily attached.

Next, in a first fixed shaft inserting step, the first fixed shaft 35 is inserted into the shaft hole 81 of the output member 8 from the through hole 37 of the second plate part 32 and the first shaft end part 351 is fitted to the first fixed shaft support hole 36 of the first plate part 31. In this case, the first shaft end part 351 is abutted with the protruded part 361 in the inside of the first fixed shaft support hole 36 and is positioned in the motor axial line "L" direction. Therefore, an end part of the first shaft end part 351 is not protruded from the first plate part 31 to the opposite-to-output side "L2". Accordingly, even when the first fixed shaft 35 is provided at a position overlapping with the motor main body 10 in the motor axial line "L" direction, the first fixed shaft 35 and the motor main body 10 are not interfered with each other.

Next, in a first fixed shaft fixing step, the second shaft end part 352 and the second plate part 32 are fixed to each other by welding. As a result, the geared motor 1 is completed.

(Principal Effects in this Embodiment)

As described above, in the geared motor 1 in this embodiment, the output member 8 formed with the spiral groove 83 on its outer peripheral portion is provided between the first plate part 31 and the second plate part 32 of the frame 3, and rotation of the motor pinion 55 fixed to the rotation shaft 50 is decelerated through the transmission gears (first transmission gear 91 and second transmission gear 92) of the reduction gear mechanism 9 to be transmitted to the output member 8. Therefore, a large torque can be outputted from the output member 8 without enlarging the diameter of the gear part 85 of the output member 8.

Further, the first fixed shaft 35 is provided between the first plate part 31 and the second plate part 32, and the output member 8 is rotatably supported by the first fixed shaft 35. Therefore, positional accuracy of the output member 8 is high and thus positional accuracy of engagement in the spiral groove 83 and the gear part 85 is high. Accordingly, high torque transmission efficiency is maintained over a wide operating temperature range and a high torque can be outputted. Further, a bearing is not required to be provided in the first plate part 31 and thus a size of the first plate part 31 is not required to be increased. Further, a bearing is not required to be provided in the first plate part 31 and thus, even when a size of the first plate part 31 is not increased, the first fixed shaft 35 can be provided at a position overlapping with the motor main body 10 in the motor axial line "L" direction. Therefore, a size of the geared motor 1 can be reduced.

Further, the first plate part 31 is provided with the first fixed shaft support hole 36 to which the first shaft end part 351 of the first fixed shaft 35 is fitted, and the second plate part 32 is provided with the through hole 37 to which the second shaft end part 352 of the first fixed shaft 35 is fitted. Therefore, after the output member 8 is disposed between the first plate part 31 and the second plate part 32, the first fixed shaft 35 is inserted into the shaft hole 81 of the output member 8 through the through hole 37 of the second plate part 32 so that the first shaft end part 351 is fitted to the first fixed shaft support hole 36 and, after that, the second shaft end part 352 and the second plate part 32 can be fixed to each other. Accordingly, the output member 8 can be rotatably supported between the first plate part 31 and the second plate part 32 without providing a large opening part for passing the output member 8 in the first plate part 31. Especially, in this embodiment, the output member 8 is made of resin and thus, an outer diameter of the output member 8 is required to be increased for securing its strength. However, according to this embodiment, a large opening part for passing the output member 8 is not required to be provided in the first plate part 31. Therefore, a size of the first plate part 31 is not required to be increased. Accordingly, a size of the geared motor 1 can be reduced.

Further, a large opening part is not required to be provided in the first plate part 31 and thus, even when a size of the first plate part 31 is not increased, the second fixed shafts 96, 97 and 98 which support the transmission gears (first transmission gear 91, second transmission gear 92 and third transmission gear 93) can be provided at appropriate positions. Therefore, a size of the geared motor 1 can be reduced. Further, a large opening part is not required to be provided in the first plate part 31 and thus, the rotation center axial line of the second transmission gear 92 and the rotation center axial line of the output member 8 are not required to be largely separated from each other. Therefore, a sufficient reduction gear ratio can be obtained without increasing an outer diameter of the final gear (third transmission gear 93) and an outer diameter of the gear part 85 of the output member 8. Accordingly, the size of the geared motor 1 can be reduced.

Further, in the first plate part 31, coordinate positions of the output member 8 and the transmission gears (first transmission gear 91, second transmission gear 92 and third transmission gear 93) can be set and thus, positional accuracy of engagement in the reduction gear mechanism 9 is high. Therefore, high torque transmission efficiency is maintained over a wide operating temperature range and a high torque can be outputted.

Further, the motor pinion 55, the transmission gears (first transmission gear 91, second transmission gear 92 and third transmission gear 93) and the gear part 85 of the output member 8 are covered by the gear cover 7. Therefore, a foreign matter is hard to be stuck to the motor pinion 55, the transmission gears (first transmission gear 91, second transmission gear 92 and third transmission gear 93) and the gear part 85 of the output member 8. Further, even in a case that grease is applied between the motor pinion and the transmission gears, and that grease is applied to the motor pinion 55, the transmission gears (first transmission gear 91, second transmission gear 92 and third transmission gear 93) and the gear part 85 of the output member 8, a foreign matter is hard to be stuck to the grease.

Further, in this embodiment, rotation of the motor pinion 55 is decelerated and transmitted to the output member 8 through the transmission gears (first transmission gear 91, second transmission gear 92 and third transmission gear 93) of the reduction gear mechanism 9. Therefore, even when an outer diameter of the gear part 85 of the output member 8 is set to be smaller than that of the portion 84 formed with the spiral groove 83, a large torque can be outputted. Accordingly, the geared motor 1 can be avoided being enlarged due to the gear part 85 of the output member 8. Further, even in a case that the gear cover 7 is provided, the side plate part 72 of the gear cover 7 which covers the outer peripheral portion of the gear part 85 of the output member 8 is located at a position close to the rotation center axial line of the output member 8. Therefore, the geared motor 1 can be avoided being enlarged due to the gear cover 7. Especially, in this embodiment, the side plate part 72 is overlapped with the first plate part 31 in the motor axial line "L" direction and thus, the geared motor 1 can be avoided being enlarged due to the side plate part 72 of the gear cover 7.

INDUSTRIAL APPLICABILITY

In the present invention, the output member formed with the spiral groove on its outer peripheral portion is provided between the first plate part and the second plate part of the frame, and rotation of the motor pinion fixed to the rotation shaft is decelerated through the transmission gears to be transmitted to the output member. Therefore, even when a diameter of the gear part of the output member is not increased, a large torque can be outputted. Further, the first fixed shaft is provided between the first plate part and the second plate part and the output member is rotatably supported by the first fixed shaft. Therefore, since a bearing is not required to be provided in the first plate part, a size of the first plate part is not required to be increased. Accordingly, a size of the motor can be reduced. Further, the first plate part is provided with the first fixed shaft support hole into which the first shaft end part of the first fixed shaft is fitted, and the second plate part is provided the through hole into which the second shaft end part of the first fixed shaft is fitted. Therefore, after the output member is disposed between the first plate part and the second plate part, the first fixed shaft is inserted into the shaft hole of the output member through the through hole of the second plate part and the first shaft end part is fitted to the first fixed shaft support hole and, after that, the second shaft end part and the second plate part can be fixed to each other. Therefore, even when a large opening part for passing the output member is not provided in the first plate part, the output member can be rotatably supported between the first plate part and the second plate part. Further, since a large opening part is not required to be provided in the first plate part, even when a size of the first plate part is not increased, the second fixed shaft which supports the transmission gear can be provided at an appropriate position. Therefore, a size of the geared motor can be reduced.

The invention claimed is:

1. A geared motor comprising:
a motor main body;
a frame comprising:
a first plate part which is fixed to an end part on one side in a motor axial line direction of the motor main body;
a second plate part which faces the first plate part on the one side; and
a third plate part which connects the first plate part with the second plate part;
a first fixed shaft which is disposed between the first plate part and the second plate part;
an output member comprising:
a shaft hole through which the first fixed shaft is penetrated; and
a gear part and a spiral groove which are provided on an outer peripheral portion of the output member in order from the other side to the one side in the motor axial line direction;
a second fixed shaft whose shaft end part on the other side is held by the first plate part;
a transmission gear which is rotatably supported by the second fixed shaft and decelerates rotation of a motor pinion fixed to a rotation shaft of the motor main body to transmit to the gear part; and
a gear cover which is fixed to the frame between the first plate part and the second plate part,
wherein the first fixed shaft is fixed so that, in a state that a first shaft end part on the other side is fitted to a first fixed shaft support hole provided in the first plate part, and that a second shaft end part on the one side is fitted to a through hole provided in the second plate part, the second shaft end part and the second plate part are fixed to each other,
wherein the gear cover comprises an end plate part which covers the motor pinion, the transmission gear and the gear part on the one side; and a side plate part which covers an outer peripheral portion of the gear part on an opposite side to the transmission gear; and
wherein the end plate part comprises an opening part from which a portion provided with the spiral groove of the output member is protruded to the one side.

2. The geared motor according to claim 1, wherein the first fixed shaft is provided at a position overlapped with the motor main body in the motor axial line direction.

3. The geared motor according to claim 2, wherein the first shaft end part is abutted with a protruded part in an inside of the first fixed shaft support hole or a bottom part of the first fixed shaft support hole.

4. The geared motor according to claim 1, wherein the end plate part comprises a second fixed shaft support hole which supports a shaft end part on the one side of the second fixed shaft.

5. The geared motor according to claim 4, wherein a face on the other side of the end plate part comprises a recessed part which is extended in a direction intersecting a motor axial line from the second fixed shaft support hole.

6. The geared motor according to claim 1, wherein the gear cover comprises an engaging part which is engaged with the frame when the gear cover is disposed between the first plate part and the second plate part from a direction intersecting the motor axial line direction.

7. The geared motor according to claim 1, wherein the output member is made of resin.

8. The geared motor according to claim 1, wherein the second shaft end part is fixed to the second plate part by welding.

9. A manufacturing method for a geared motor, the geared motor comprising:
a motor main body;
a frame comprising:
a first plate part which is fixed to an end part on one side in a motor axial line direction of the motor main body;
a second plate part which faces the first plate part on the one side; and
a third plate part which connects the first plate part with the second plate part;
a first fixed shaft which is disposed between the first plate part and the second plate part;
an output member comprising:
a shaft hole through which the first fixed shaft is penetrated; and
a gear part and a spiral groove which are provided on an outer peripheral portion of the output member in order from the other side to the one side in the motor axial line direction;
a second fixed shaft whose shaft end part on the other side is held by the first plate part; and
a transmission gear which is rotatably supported by the second fixed shaft and decelerates rotation of a motor pinion fixed to a rotation shaft of the motor main body to transmit to the gear part;
the manufacturing method comprising:
a frame fixing step in which the first plate part is previously provided with a first fixed shaft support hole to which a first shaft end part on the other side of the first fixed shaft is fitted, and the second plate part is previously provided with a through hole to which a second shaft end part on the one side of the first fixed shaft is fitted, and the frame is fixed to the motor main body;
a gear attaching step in which the transmission gear is attached to the first plate part through the second fixed shaft before or after the frame fixing step;
an arrangement step in which the output member is disposed between the first plate part and the second plate part from a direction intersecting the motor axial line direction;
a first fixed shaft inserting step in which the first fixed shaft is inserted into the shaft hole through the through hole and the first shaft end part is fitted to the first fixed shaft support hole; and
a first fixed shaft fixing step in which the second shaft end part and the second plate part are fixed to each other.

10. The manufacturing method for a geared motor according to claim 9, wherein
the geared motor comprises a gear cover comprising:
an end plate part which covers the motor pinion, the transmission gear and the gear part on the one side; and
a side plate part which covers an outer peripheral portion of the gear part on an opposite side to the transmission gear;
the end plate part of the gear cover comprises an opening part from which a portion provided with the spiral groove of the output member is protruded to the one side, and
in the arrangement step, the gear cover is disposed between the first plate part and the second plate part together with the output member, and the gear cover is fixed to the frame.

11. The manufacturing method for a geared motor according to claim 10, wherein
the end plate part is previously provided with a second fixed shaft support hole which supports a shaft end part on the one side of the second fixed shaft, and
in the arrangement step, the shaft end part on the one side of the second fixed shaft is fitted to and supported by the second fixed shaft support hole.

12. The manufacturing method for a geared motor according to claim 11, wherein
a face on the other side of the end plate part is previously provided with a recessed part which is extended in a direction intersecting a motor axial line from the second fixed shaft support hole, and
in the arrangement step, when the output member and the gear cover are to be disposed between the first plate part and the second plate part, the shaft end part on the one side of the second fixed shaft is passed in an inside of the recessed part and fitted to the second fixed shaft support hole.

13. The manufacturing method for a geared motor according to claim 10, wherein
the gear cover is previously provided with an engaging part which is engaged with the frame when the gear cover is disposed between the first plate part and the second plate part, and
in the arrangement step, when the gear cover is disposed between the first plate part and the second plate part, the first plate part and the engaging part are engaged with each other and the gear cover is fixed to the frame.

14. A geared motor comprising:
a motor main body;
a frame comprising:
a first plate part which is fixed to an end part on one side in a motor axial line direction of the motor main body;
a second plate part which faces the first plate part on the one side; and
a third plate part which connects the first plate part with the second plate part;
a first fixed shaft which is disposed between the first plate part and the second plate part;
an output member comprising:
a shaft hole through which the first fixed shaft is penetrated; and
a gear part and a spiral groove which are provided on an outer peripheral portion of the output member in order from the other side to the one side in the motor axial line direction;
a second fixed shaft whose shaft end part on the other side is held by the first plate part; and
a transmission gear which is rotatably supported by the second fixed shaft and decelerates rotation of a motor pinion fixed to a rotation shaft of the motor main body to transmit to the gear part;
wherein the first fixed shaft is fixed so that, in a state that a first shaft end part on the other side is fitted to a first fixed shaft support hole provided in the first plate part, and that a second shaft end part on the one side is fitted to a through hole provided in the second plate part, the second shaft end part and the second plate part are fixed to each other, and
wherein the second shaft end part is fixed to the second plate part by welding.

* * * * *